United States Patent
Mathai et al.

(10) Patent No.: US 8,520,470 B2
(45) Date of Patent: Aug. 27, 2013

(54) LASER SHOCK PEENING MEASUREMENT SYSTEM AND METHOD

(75) Inventors: Manu Mathai, Tamil Nadu (IN); Gabriel Della-Fera, Greenville, SC (US)

(73) Assignee: General Electric Company, Schenectady, NY (US)

( * ) Notice: Subject to any disclaimer, the term of this patent is extended or adjusted under 35 U.S.C. 154(b) by 525 days.

(21) Appl. No.: 12/786,031

(22) Filed: May 24, 2010

(65) Prior Publication Data

US 2011/0285994 A1    Nov. 24, 2011

(51) Int. Cl.
*B06B 1/06*    (2006.01)
*G01S 7/521*   (2006.01)

(52) U.S. Cl.
CPC ..................... *G01S 7/521* (2013.01)
USPC ........................................ 367/140

(58) Field of Classification Search
USPC ........................................ 367/140; 356/318
See application file for complete search history.

(56) References Cited

U.S. PATENT DOCUMENTS

| | | | |
|---|---|---|---|
| 4,401,477 A * | 8/1983 | Clauer et al. ................. | 148/525 |
| 5,438,553 A | 8/1995 | Wilson et al. | |
| 6,078,022 A * | 6/2000 | Dulaney et al. .......... | 219/121.85 |
| 6,191,385 B1* | 2/2001 | O Loughlin et al. ...... | 219/121.83 |
| 2001/0045416 A1* | 11/2001 | Sokol et al. ............. | 219/121.62 |
| 2003/0024915 A1* | 2/2003 | Clauer et al. ............ | 219/121.85 |
| 2004/0089812 A1* | 5/2004 | Favro et al. ................ | 250/341.6 |
| 2005/0120803 A1* | 6/2005 | Sokol et al. ................ | 73/801 |
| 2005/0167596 A1* | 8/2005 | Rothenfusser et al. ..... | 250/341.6 |
| 2006/0102609 A1* | 5/2006 | Dane et al. .............. | 219/121.85 |
| 2007/0045544 A1* | 3/2007 | Favro et al. ............... | 250/341.6 |
| 2009/0084767 A1* | 4/2009 | Deaton et al. ........... | 219/121.83 |
| 2009/0294692 A1* | 12/2009 | Bourke et al. ............. | 250/459.1 |
| 2010/0008786 A1* | 1/2010 | Timoshkin et al. ....... | 416/223 R |

* cited by examiner

*Primary Examiner* — Isam Alsomiri
*Assistant Examiner* — James Hulka
(74) *Attorney, Agent, or Firm* — Cantor Colburn LLP

(57) ABSTRACT

A method of monitoring laser shock peening of a material includes forming an ablative layer on the material, directing the laser beam at the ablative layer to produce an acoustic wave in the material, converting the acoustic wave in the material to thermal energy external to the material and measuring the thermal energy.

12 Claims, 2 Drawing Sheets

LASER SHOCK PEENING MEASUREMENT SYSTEM AND METHOD

BACKGROUND OF THE INVENTION

The subject matter disclosed herein relates to treating metal and, in particular, to monitoring laser metal treatments.

Laser peening, or laser shock peening (LSP), is a process of inducing beneficial residual compressive stresses into a material (usually metal) by using a powerful laser. As used herein, a material being processed shall be referred to as a "treated material." An ablative coating, usually black tape or paint, is applied to the treated material to absorb the energy from a laser. Short energy pulses from the laser are then focused to explode the ablative coating, producing a shock wave. The process may be repeated in multiple locations. A translucent layer, usually consisting of water, is required over the coating and acts as a tamp, directing the shock wave into the treated material.

A piezoelectric sensor is normally used for real time (online) monitoring of LSP processing. The piezoelectric sensor converts the stress (acoustic) waves created by LSP into an electric signal proportional to the strength of the wave. The electric signal may then be used to monitor the LSP process. The piezoelectric sensor, however, is often destroyed because it is in direct contact with the treated material. The one-use destruction of these gauges requires the use of multiple gauges for wherever multiple laser pulses are needed.

BRIEF DESCRIPTION OF THE INVENTION

According to one aspect of the invention, a laser shock peening (LSP) measurement device for measuring energy provided to a treated material during an LSP process is provided. The device of this embodiment includes an energy converter configured to receive acoustic energy from the treated material and to convert the acoustic energy to thermal energy. The device of this embodiment also includes an energy measurement device coupled to the energy converter that produces an electrical output based on the thermal energy proportional to the acoustic energy.

According to another aspect of the invention, a method of monitoring laser shock peening of a material is provided. The method includes forming an ablative layer on the material, directing the laser beam at the ablative layer to produce an acoustic wave in the material, converting the acoustic wave in the material to thermal energy external to the material and measuring the thermal energy.

According to yet another aspect of the invention, a turbine is provided. The turbine of this embodiment is prepared by a process comprising: forming an ablative layer on a blade of the turbine; directing the laser beam at the ablative layer to produce an acoustic wave in the material; converting the acoustic wave in the material to thermal energy external to the material; and measuring the thermal energy.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As described above, utilizing piezoelectric sensors in LSP processing requires the use of multiple sensors because the sensors can be destroyed by one use. In addition, monitoring the LSP process by measuring the acoustic waves directly results in operator discomfort due to the high sound levels produced. Indeed, some LSP processes create sound levels ranging from 100 to 140 dB.

Embodiments of the present invention may convert the acoustic waves to another form of energy to reduce the sound level associated with LSP processing. In addition, conversion of the waves to another form may increase the lifetime of sensors used to monitor LSP processes.

Embodiments of the present invention may allow for sensors utilized in online LSP monitoring to be reused because they are not in direct contact with material being processed. In one embodiment, this may be accomplished by modifying the measured energy from acoustic to thermal through the use of magnetic fields and an electrically conductive medium. In particular, the acoustic wave is transmitted away from the treated material by an acoustic coupler having the same or similar acoustic impedance as the treated material. This acoustic wave is then converted to heat. The conversion may occur, for example, in an electrically conductive medium. In one embodiment, coils that generate a magnetic field may surround the medium.

The electrically conductive medium and the coils may be enclosed inside a housing or container made of a material having a different acoustic impedance than the treated material in order to prevent acoustic energy loss due to transmission to the outside environment. In one embodiment, the temperature rise of the medium inside the container heats a thermally conductivity plate that contacts the container. The resultant temperature increase of the thermal plate is converted into an electric voltage by a sensor.

In an alternative embodiment, the thermally conductive plate may be omitted and temperature changes in the medium may be directly measured using techniques known in the art. For instance, temperature changes may be measured using an IR detector or a radiometer.

Figure 1:
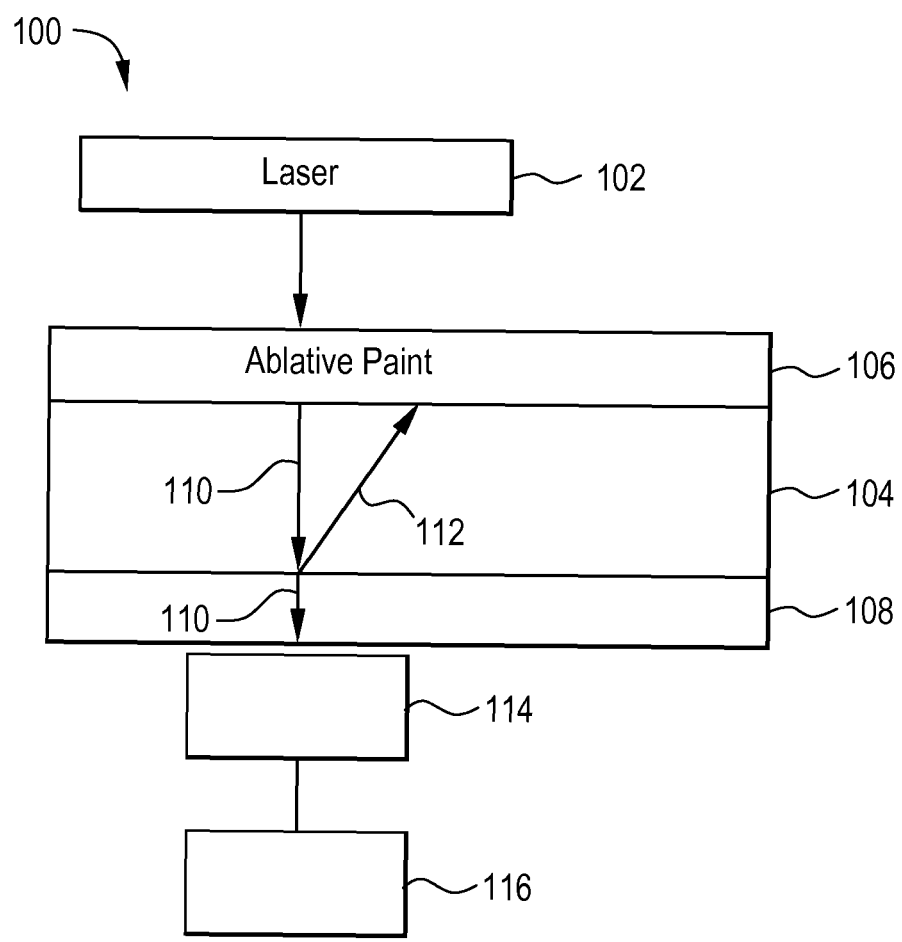
FIG. 1 shows an LSP system according to one embodiment of the present invention.

FIG. 1 shows an LSP system 100 according to one embodiment of the present invention. The LSP system 100 includes a laser 102 and a treated material 104. In one embodiment, the treated material 104 is a metal. In a specific embodiment, the treated material may be metal the forms the blades of turbine. Accordingly, the system 100 may be used to create turbines. Of course, the system 100 may be utilized in other contexts as well.

The treated material 104 may include an ablative layer 106 affixed to a first side 105 thereof. The ablative layer 106 may be formed of a black tape or paint and is applied to absorb the energy imparted by the laser 102. On a second side 107 the treated material 104 may include an acoustic coupler 108 in intimate contact therewith. The acoustic coupler 108 may have the same or substantially the same acoustic impedance as the treated material 104.

In operation, the laser 102 is directed at the ablative material 106. Short energy pulses are then focused to explode the ablative material 106, producing a shock waves 110. The shock waves 110 may have detrimental effects if allowed to reflect inside the treated material 104. Reflected waves are indicated by reference numeral 112. The reflected waves 112 can propagate cracks due to their tensile nature and reduce the life of the treated material 104.

It has been discovered that placing the acoustic coupler 108 in intimate contact with the treated material 104 may reduce or eliminate reflected waves 112. In particular, use of an acoustic coupler 108 transmits the shock waves out of the treated material 104. The waves transmitted out of the treated material 104 may be used for online monitoring of LSP processes.

One embodiment of the present invention includes an energy converter 114 coupled to the acoustic coupler 108. The energy converter 114 may convert the acoustic shock waves 110 to another form of energy. In one embodiment, the energy converter 114 converts the acoustic waves into thermal energy.

An energy measurement device 116 may measure the converted energy output by the energy converter 114. In one embodiment, the energy measurement device 116 may include a thermally conductivity plate that contacts the energy converter 114. The resultant temperature increase of the thermal plate is converted into an electric signal (current or voltage) by a sensor forming part of the energy measurement device 116. Such an energy measurement device 116 (LSP sensor) may be utilized more than once because it is not destroyed by direct contact with a shock wave as in the prior art. In an alternative embodiment, the energy measurement device 116 may measure temperature changes in the electrically conductive material directly. For instance, an energy measurement device 116 implemented as an IR detector or a radiometer may directly measure temperature changes.

Figure 2:
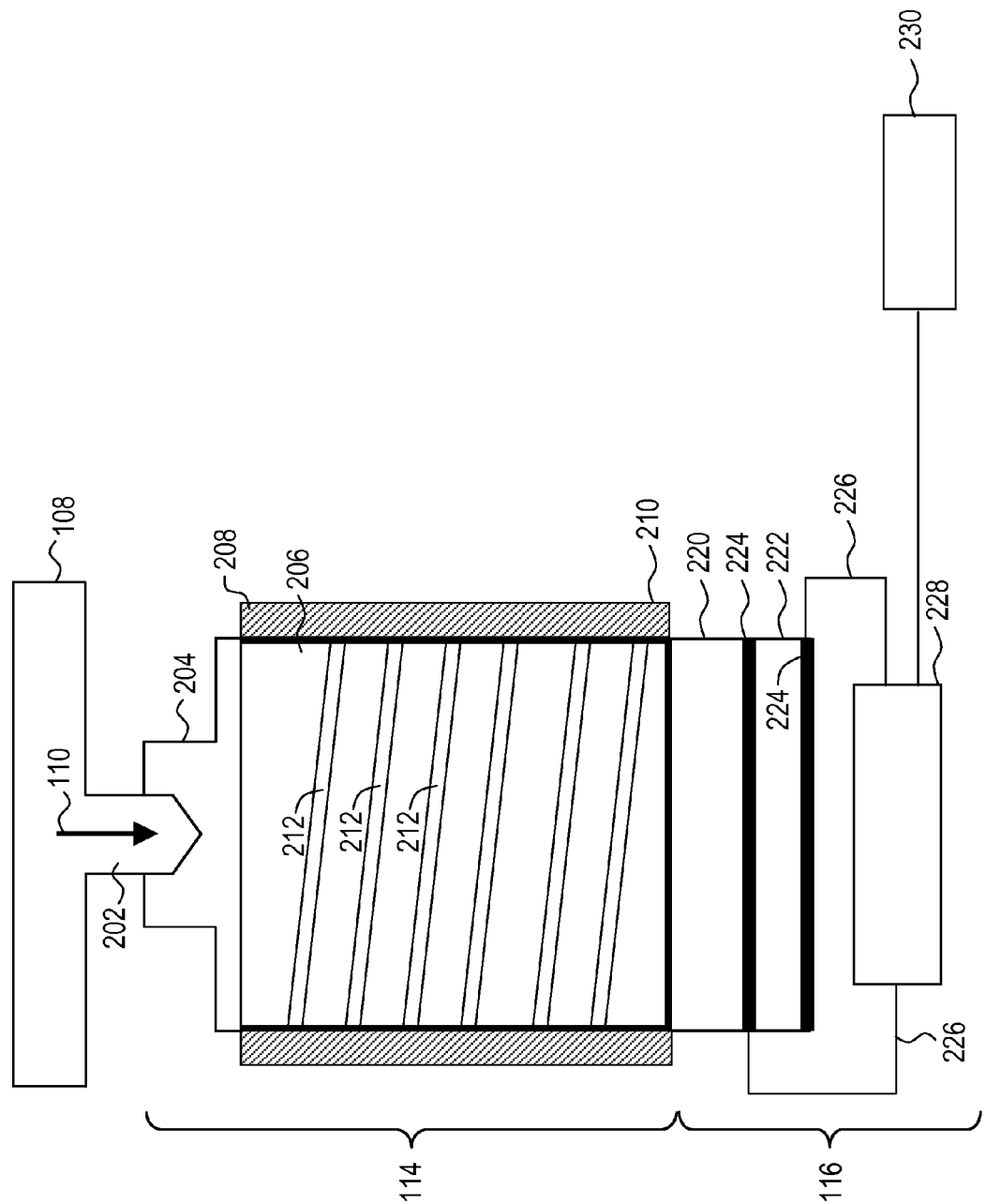
FIG. 2 shows a detailed example of an energy converter according to one embodiment of the present invention.

FIG. 2 shows a more detailed example of an energy converter 114 according to one embodiment of the present invention. The energy converter 114 is coupled between an acoustic coupler 108 and an energy measurement device 116. The energy converter 114 converts acoustic energy (waves) to thermal energy in one embodiment.

The acoustic coupler 108 may include a plunger 202. The plunger 202 directs and transmits the shock wave 110 to the energy converter 114. In particular, the plunger 202 directs and transmits the shock waves 110 to a piston 204 of the energy converter 114.

When an electric conductor is made to move in a magnetic field, an electromotive force is produced. The electric conductor can be replaced by any electrically conducting medium (such as a fluid or a gas) that is a good conductor of electricity. The medium can be made electrically conducting by ionization or by other means known in the art.

In one embodiment, the energy converter 114 includes an electrically conducting medium 206 disposed within a container 208. The electrically conducting medium 206 may be set into motion by shock waves 110 being transmitted to piston 204.

In more detail, the shock waves 110 generated during LSP may cause motion in the electrically conducting medium 206 after traversing through the treated material and the acoustic coupler 108. In the event the acoustic coupler 108 is formed of a material with the same acoustic impedance as the treated material, the transmission ratio may be increased. Forming the acoustic coupler 108 such that it includes the plunger 202 may focus the shock wave.

In one embodiment, the acoustic coupler 108 generally, and plunger 202 in particular, may be coupled to piston 204. In one embodiment, the piston 204 may be made of acoustically similar material to the acoustic coupler 108. The acoustic waves from the piston 204 then traverse through the electrically conducting medium 206 within the container 208. The container 208 may be made of a material having a dissimilar acoustic impedance from the treated material 104 so that there is no loss of acoustic energy inside the container 208 due to transmission of the waves to the outside. In one embodiment, the container 208 may include a casing 210 disposed on its outer walls. The casing 210 may be made of material having a dissimilar acoustic impedance to prevent any acoustic transmissions and reflect all the energy inside the container 208.

In operation, a magnetic field is generated in the medium 206 inside the container 208 by passing a suitable current through coils 212 surrounding the medium 206. In one embodiment, coils 212 are disposed within the container 208. In another embodiment, the coils 212 surround the container 208. The magnetic field can also be generated without the coils by the use of permanent magnets or electromagnets.

The electrically conducting medium 206 is set into motion by the electromotive force of a magnetic field produced by the coils 212. The magnetic field is the result of applying a current via leads 230 to the coils. In one embodiment, the flux produced by the magnetic field is aligned so that it is in a different direction than the shock wave 110 travels. In one embodiment, the flux is aligned in an opposite direction than the shock wave 110 travels. The energy of the shock wave 110 gets reduced as it gets converted to electromotive force. In particular, eddy currents are generated in the medium 206 due to the electromotive force and, thus, the shock wave 110 gets converted into thermal energy due to its electromotive force acting in opposition to the magnetic flux generated by the coils 212. Thus, there is an increase in the temperature of the medium 206. This temperature rise is proportional to the strength of the shock waves and the magnetic flux generated by the coils 212.

In one embodiment, the container 208 may be formed of a high-temperature material capable of withstanding the high temperatures generated. The container 208 may, as described above, may be made of material that has different acoustic impedance than the acoustic coupler 108 so that any acoustic waves that have a tendency to escape the container 208 are not allowed to do so and are contained therein.

In one embodiment, the electrically conducting medium 206 is an electrically conducting fluid, an organic/inorganic fluid, or a gas, that has an acoustic impedance similar to or the same as the acoustic impedance of the acoustic coupler 108. The impedance match can be made when the fluid used has same Bulk modulus/density values.

The energy converter 108 may be coupled to energy measurement device 116. The energy measurement device 116 may be a temperature sensor in one embodiment. In such an embodiment, the energy measurement device 116 may include a first conductive plate 220 in thermal contact with the container 208. In one embodiment, the first conductive plate 220 directly contacts the container 208. In one embodiment, the first conductive plate 220 is made of a material having a high thermal conductivity. The temperature increase in the electrically conducting medium 206 (and container 208) is thus transferred through the first conducting plate 220.

In one embodiment, the first conductive plate contacts a pyroelectric layer 222. The pyroelectric layer 222 may be coated on both sides with suitable electrically conductive layers 224. A temperature increase in the pyroelectric layer 222 is converted into a voltage between the electrically conductive layers 224. The combination of the pyroelectric layer 222 and the electrically conductive layers 224, therefore, form a pyroelectric transducer.

In one embodiment, conductive wires 226 are connected to the electrically conductive layers 224 and the voltage difference may be measure by a voltage meter 228. Of course, any means of determining the voltage difference (or a current created) due to the temperature change transmitted to the pyroelectric transducer 222 may be utilized. In one embodiment, the voltage output is displayed on a screen and may be used as a direct indication of any water or paint malfunction. Any process inadequacies translate to a reduction in the shock pressure produced which results in a lower temperature rise in the electrically conducting fluid.

In one embodiment, the energy temperature measurement device 116 may be connected to a comparator 230, which compares the measured temperature value to predetermined limits set for process parameters. For example, if the thickness of the ablative paint is not optimal or the water flow rate is not optimal, the shock wave intensity produced is much less. This results in a non-optimal laser shock peening process and lower depth of residual compressive stresses. The comparator 230 compares the deviation of the signal from the optimal process parameters and sends a defect alarm if any deviation is detected. The comparator can thus detect the exact location and send a signal to carry out the laser shock processing again with revised set of process parameters (like water flow rate, paint thickness etc.), to get the desired peening effect. Thus, real-time monitoring of the process variables can be ensured.

Alternately the thermal energy can be directly measured using techniques known in the art like IR, radiometer etc instead of converting the temperature to an electric output through a pyroelectric transducer.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A laser shock peening (LSP) measurement device for measuring energy provided to a treated material during an LSP process, the device comprising:
    an energy converter configured to receive acoustic energy from the treated material and to convert the acoustic energy to thermal energy, the energy converter including:
        a container having a first acoustic impedance;
        an electrically conducting medium within the container;
        one or more coils disposed within the container; and
        a piston at a first end of the container, the piston having a second acoustic impedance different than the first acoustic impedance and contacting the electrically conducting medium; and
    an energy measurement device coupled to the energy converter that produces an electrical output based on the thermal energy proportional to the acoustic energy.

2. The device of claim 1, further comprising:
    an acoustic coupler coupled between the piston and the treated material, the acoustic coupler having a third acoustic impedance.

3. The device of claim 2, wherein the third acoustic impedance is the same as the second acoustic impedance.

4. The device of claim 1, wherein the one or more coils receive an electric current and produce an electric flux in a first direction and wherein the piston moves in a second direction different than the first direction.

5. The device of claim 1, wherein the acoustic coupler includes a plunger and wherein the plunger is coupled to the piston.

6. The device of claim 1, wherein the energy measurement device includes a pyroelectric layer in thermal contact with the energy conversion device.

7. The device of claim 1, in combination with a laser.

8. The device of claim 1, further comprising:
    a comparator coupled to the energy measurement device that compares the electrical output to predetermined ranges to determine effectiveness of an LSP process.

9. A method of monitoring laser shock peening of a material, the method comprising:
    forming an ablative layer on the material;
    directing the laser beam at the ablative layer to produce an acoustic wave in the material;
    converting the acoustic wave in the material to thermal energy external to the material, wherein converting includes directing the acoustic wave to an electrically conducting material in a first direction and creating an electric flux in the electrically conducting material in a second direction, the second direction being different than the first direction; and
    measuring the thermal energy.

10. The method of claim 9, wherein the electrically conducting material is disposed within a container that includes one or more electric coils, wherein the electric flux is created when a current is applied to the electric coils.

11. The method of claim 9, wherein directing includes:
    attaching an acoustic coupler to the material.

12. The method of claim 11, wherein the acoustic coupler has an acoustic impedance that matches an acoustic impedance of the material.

* * * * *